United States Patent [19]
Haruma et al.

[11] Patent Number: 5,761,343
[45] Date of Patent: Jun. 2, 1998

[54] IMAGE REPRODUCTION APPARATUS AND IMAGE REPRODUCTION METHOD

[75] Inventors: Kazuhiko Haruma; Kenji Kawai, both of Tokyo, Japan

[73] Assignee: Canon Kabushiki Kaisha, Tokyo, Japan

[21] Appl. No.: 561,697

[22] Filed: Nov. 22, 1995

[30] Foreign Application Priority Data

Nov. 28, 1994 [JP] Japan .................... 6-293157

[51] Int. Cl.$^6$ .................................. G06K 9/36
[52] U.S. Cl. .................................. 382/236
[58] Field of Search .................. 345/97; 343/105 R;
348/6, 17, 18, 19, 384, 407, 413, 416, 620,
629, 598; 358/261, 426, 430, 261.2, 443,
455, 445, 539; 369/275.3; 380/10, 20, 48;
386/8, 12, 69; 382/232, 180, 238, 245;
395/162

[56] References Cited

U.S. PATENT DOCUMENTS

| | | | |
|---|---|---|---|
| Re. 32,291 | 11/1986 | Nakagome et al. | 358/261 |
| 4,095,226 | 6/1978 | Kratzer | 343/105 R |
| 4,121,259 | 10/1978 | Preuss et al. | 358/261 |
| 4,409,623 | 10/1983 | Kobayashi et al. | 358/261 |
| 4,675,721 | 6/1987 | Dirr | 382/245 |
| 5,321,750 | 6/1994 | Nadan | 380/20 |
| 5,463,478 | 10/1995 | Makita et al. | 358/455 |
| 5,477,527 | 12/1995 | Tsuchiya et al. | 369/275.3 |
| 5,483,634 | 1/1996 | Hasegawa | 395/162 |
| 5,579,118 | 11/1996 | Bae | 386/8 |
| 5,581,368 | 12/1996 | Dirr | 382/245 |
| 5,602,940 | 2/1997 | Inoue et al. | 382/180 |
| 5,612,751 | 3/1997 | Kondo | 348/413 |
| 5,612,790 | 3/1997 | Sakamoto et al. | 386/69 |

*Primary Examiner*—Jose L. Couso
*Attorney, Agent, or Firm*—Fitzpatrick, Cella, Harper & Scinto

[57] ABSTRACT

An image reproduction apparatus has an detection circuit for detecting the phase difference between coded image data and a decoding circuit for decoding the image data. The apparatus also includes a specifying circuit for specifying the transmission timing of the image data and a control circuit for controlling the specifying circuit according to the detection result of the detection circuit.

10 Claims, 13 Drawing Sheets

JPEG DATA CONFIGURATION

FIG. 13

| | | | | | | |
|---|---|---|---|---|---|---|
| 1ch | I | B | B | P | B | B | P |
| 2ch | | I | B | B | P | B | B | P |
| 1ch (WHEN DISPLAYED) | I | B | B | P | B | B | P |

FIG. 14

| | | | | | | |
|---|---|---|---|---|---|---|
| 1ch | I | B | B | P | B | B | P |
| 2ch | I | B | B | P | B | B | P |
| 2ch (WHEN DECODED) | I | B | B | P | B | B | P |
| 1ch (WHEN DISPLAYED) | I | B | B | P | B | B | P |

IMAGE REPRODUCTION APPARATUS AND IMAGE REPRODUCTION METHOD

BACKGROUND OF THE INVENTION

1. Field of the Invention

The present invention relates to image reproduction apparatuses and image reproduction methods and, more particularly, to an image reproduction apparatus and image reproduction method in which compressed image data at a plurality of channels is decoded in synchronization.

2. Description of the Related Art

As a recent high-efficiency moving-picture coding method, the motion picture image coding expert group (MPEG) method is known.

This coding method is based on discrete cosine transformation (DCT), adaptive quantization, and variable-length coding (VLC). Taking advantage of features in moving pictures such as high frame (field) correlation, it also adaptively combines motion-compensation inter-frame (or inter-field) predictive coding.

Frames composing moving pictures are divided into intra (I) frames, predictive (P) frames, and bidirectional predictive (B) frames, and each frame is coded differently, as shown in FIG. 5, enabling the pictures to be compressed highly efficiently as a whole. An I frame is coded with DCT and other techniques within such frame. For a P frame, inter-frame (inter-field) motion-compensation predictive coding is performed with the time-forward I frame. For a B frame, inter-frame (inter-field) motion-compensation predictive coding is performed with the time-forward I or P frame, and the time-backward I or P frame.

Since the coding method and the amount of data differ between frames in image data coded in the MPEG method described above, the complexity in decoding and power consumption differ between frames and the quality of the decoded image also differs between frames.

As systems have now begun using multimedia, it is sometimes required, for example, that coded image data at a plurality of channels be decoded at the same time in order to simultaneously display a plurality of types of image data on a screen. When, for example, image data at two channels is decoded at the same time and displayed on a screen, power consumption and other factors substantially change depending on the combination of I, P, and B frames in each channel. The quality of the image on the screen also differs locally.

SUMMARY OF THE INVENTION

Accordingly, it is an object of the present invention to provide an image reproduction apparatus and an image reproduction method which prevent the above-described problems from occurring when coded data at a plurality of channels is decoded at the same time.

The foregoing object is achieved according to one aspect of the present invention through the provision of an image reproduction apparatus comprising: detection means for detecting the phase difference between coded image data; decoding means for decoding the image data; specifying means for specifying the timing the image data is transmitted; and control means for controlling the specifying means according to the detection result of the detection means.

The foregoing object is also achieved according to another aspect of the present invention through the provision of an image reproduction method wherein the phase difference between coded image data is detected and the transmission timing between image data at a plurality of channels is controlled according to the detection result.

Other objects and features of the present invention will be understood with the following part of the specification and the drawings.

BRIEF DESCRIPTION OF THE DRAWINGS

FIG. 13 is a timing chart illustrating a timing control state according to the present invention.

FIG. 14 is a timing chart illustrating another timing control state according to the present invention.

DETAILED DESCRIPTION OF THE PREFERRED EMBODIMENT

Figure 1:
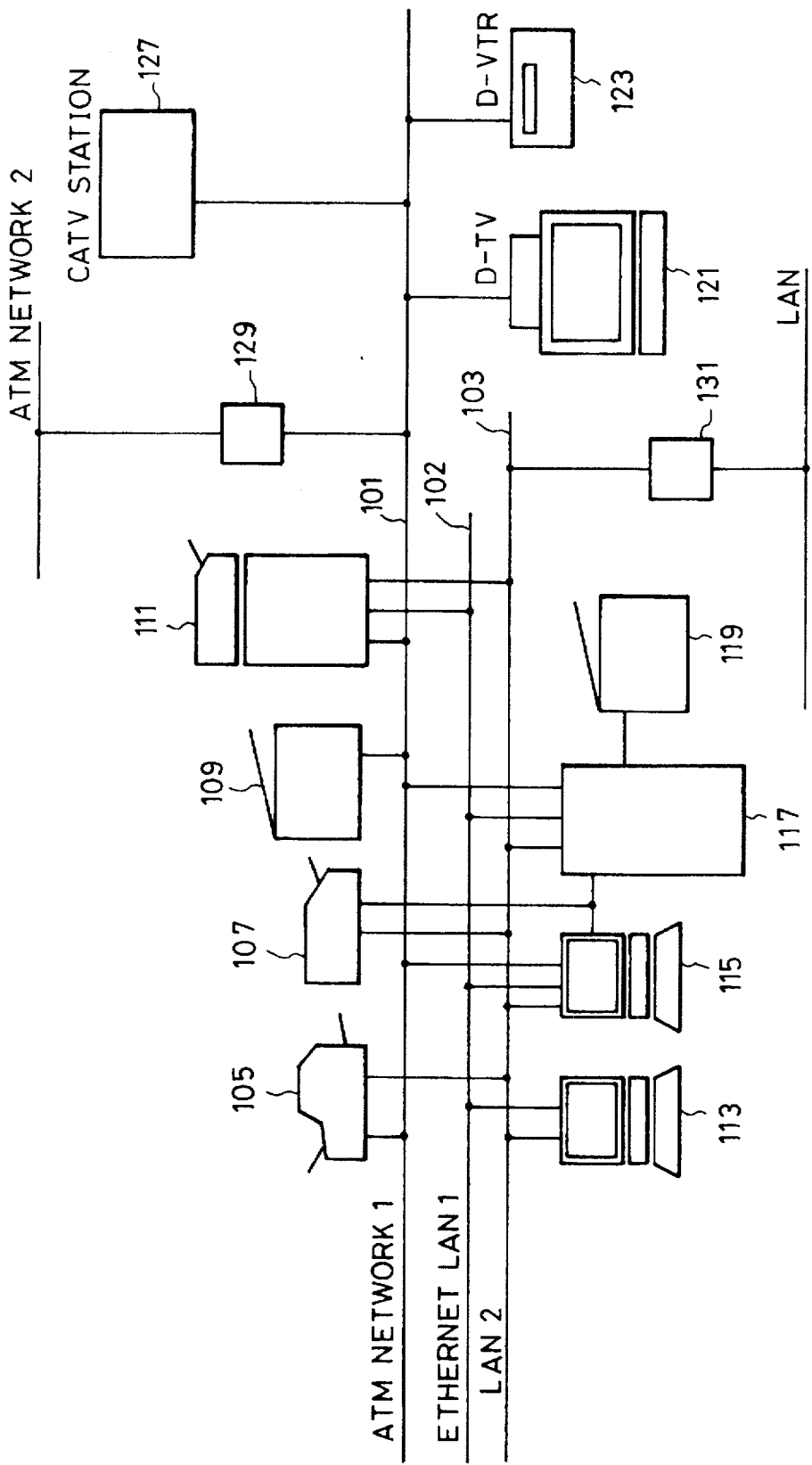
FIG. 1 shows a system according to an embodiment of the present invention.

A preferred embodiment according to the present invention will be described below for each portion by referring to the drawings.

FIG. 1 is a block diagram of the entire system of an embodiment.

In FIG. 1, there is shown an asynchronous-transmission-mode (ATM) network 101 through which various types of coded data is transmitted in ATM, including image data coded with various methods such as JPEG and MPEG, a local area network (LAN) 103, such as Ethernet, through which data is transmitted in modes other than ATM, a facsimile machine 105 connected to the ATM network and having compression and expansion functions for image data, and a color printer 107 having internal page memory and forming images according to the image data expanded from received compressed data.

A color copying machine 109 including a color reader and a color printer comprises a compression circuit for compressing according to a method such as the JPEG method the image data of an original read with the color reader, page memory for storing the compressed image data, and an expansion circuit for reading and expanding the compressed image data stored in the page memory in order to output it to the printer.

A file server 111 tentatively stores image data input through the ATM network. A workstation 113 inputs and outputs data to and from the file server. A personal computer 115 connected to the ATM network transfers MPEG data and JPEG data to and from the local area network, performs data coding and decoding, and conducts various types of processing according to the present invention, such as editing of various kinds of image data. The personal computer 115 is connected to the printer 107 via the network line 103 or a special line.

A server 117 has the same configuration as the server 111. The server 117 is connected to a color copying machine 119 which is the-same as the color copying machine 109.

A digital TV set 121 connected to the ATM network receives data coded in the MPEG or JPEG method and input via the ATM network, decodes the data, and displays it on a CRT display unit as a visible image. The display unit may be that using ferroelectric liquid crystal (FLC).

A video tape recorder (VTR) 123 receives MPEG- or JPEG-compressed image data input through the ATM network. The VTR 123 records into tape the image data as coded data as is or after the specified signal processing is applied. The VTR 123 has an image-data compression unit for compressing according to the MPEG or JPEG method not-compressed data received from the outside and for recording it into tape.

A CATV station 127 sends to the ATM network data compressed according to the MPEG or JPEG image-data compression method. As shown in the figure, the CATV station 127 outputs data for broadcasting via the ATM network line.

A router 129 connects the ATM network to another ATM network.

A router 131 connects the local area network to another local area network.

ATM network switches (not shown) are provided between the ATM network and the facsimile machine 105, between the network and the printer 107, and between the network and the color copying machine 111.

Among various types of data to be transmitted via the networks, JPEG data will be described below.

Figure 2:
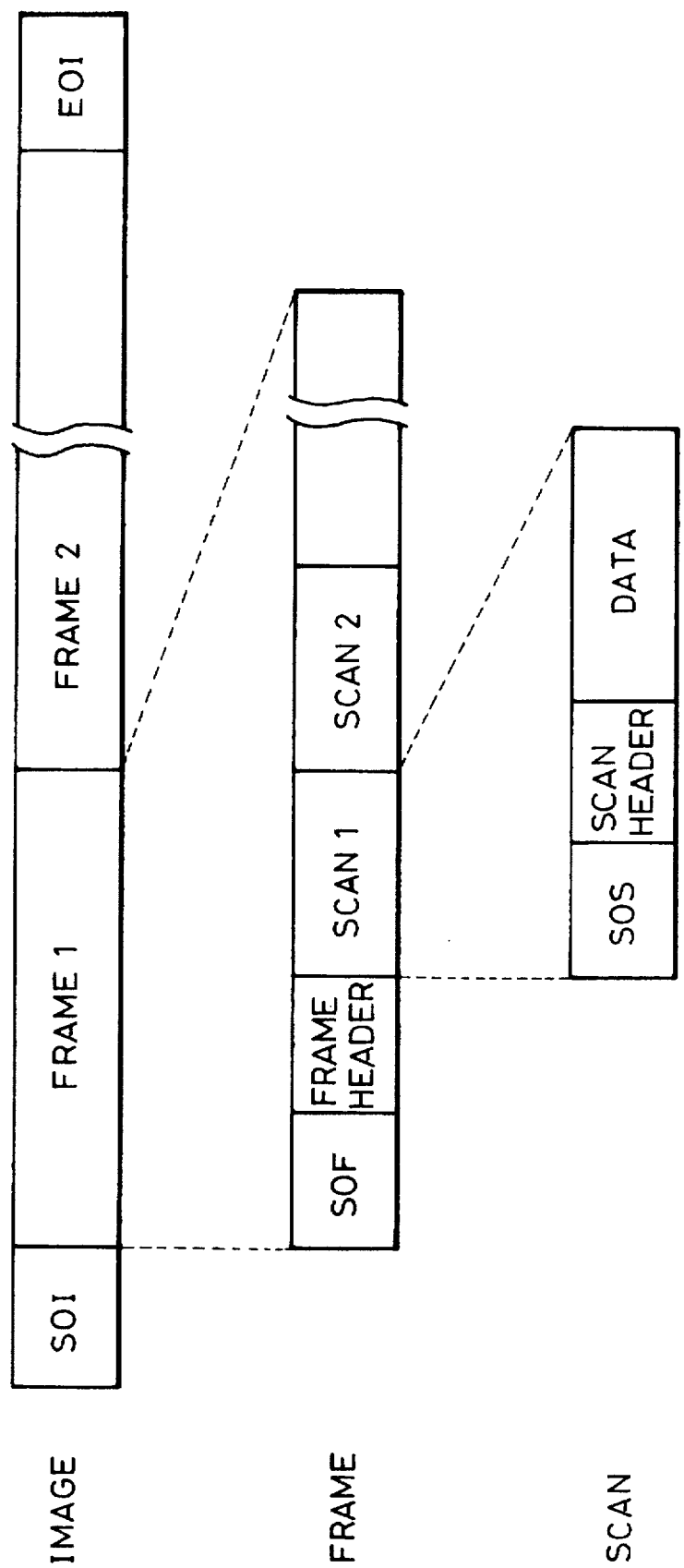
FIG. 2 illustrates the JPEG data configuration.

The JPEG method is one of international standards specified by the CCITT/ISO for the purpose of compressing color still pictures using the frequency characteristics of data and the visual characteristics of a person. The JPEG data has various marker codes and coded data in a hierarchy of image, frame, and scan layers as shown in FIG. 2.

The JPEG data comprises a start-of-image (SOI) code, a frame or frames, and an end-of-image (EOI) code. When the data is hierarchy-coded, there is provided a plurality of frames on each layer. When the data is not hierarchy-coded, there is provided a single frame.

A frame comprises a start-of-frame (SOF) code, a frame header, and a scan or scans. A scan comprises a start-of-scan (SOS) code, a scan header, and coded data.

When luminance data item (Y) and two chrominance data items (Cr and Cb) are separately coded (non-interleaved), there is provided a plurality of scans. When the data items are collectively coded (interleaved), there is provided a single scan.

Figure 3:
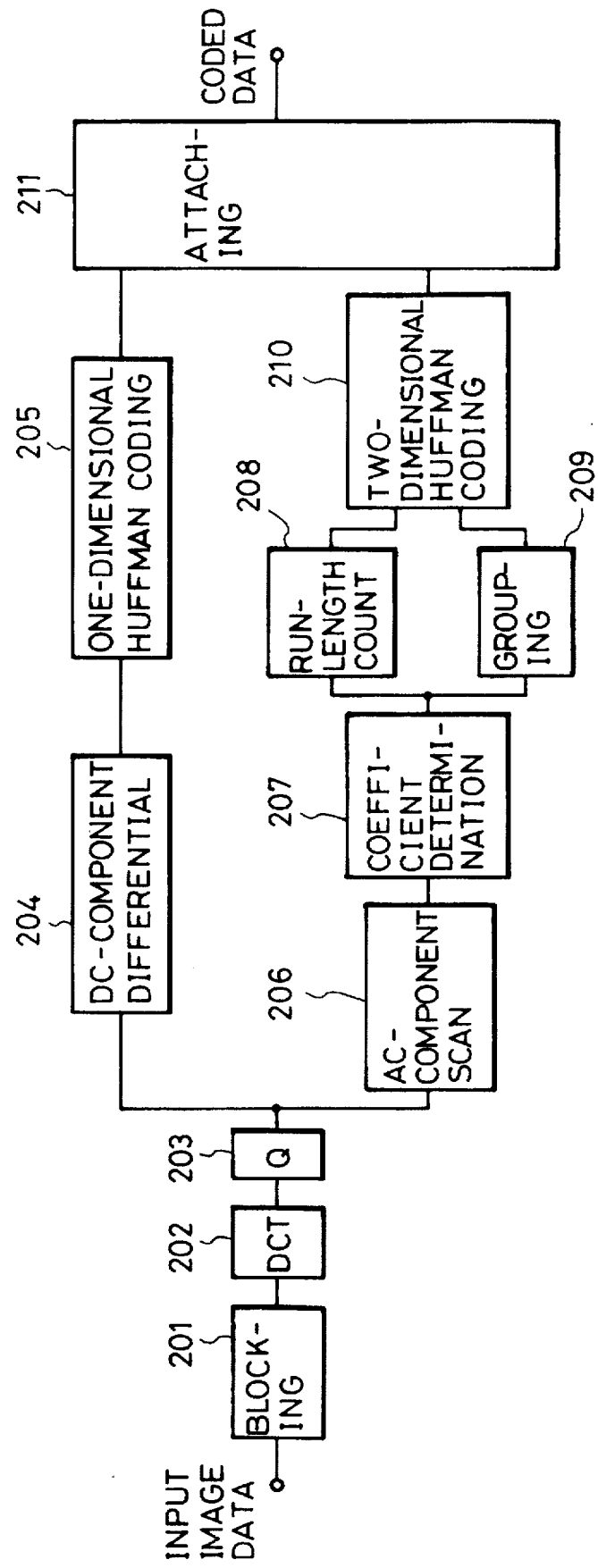
FIG. 3 shows a JPEG coder.
Figure 4:
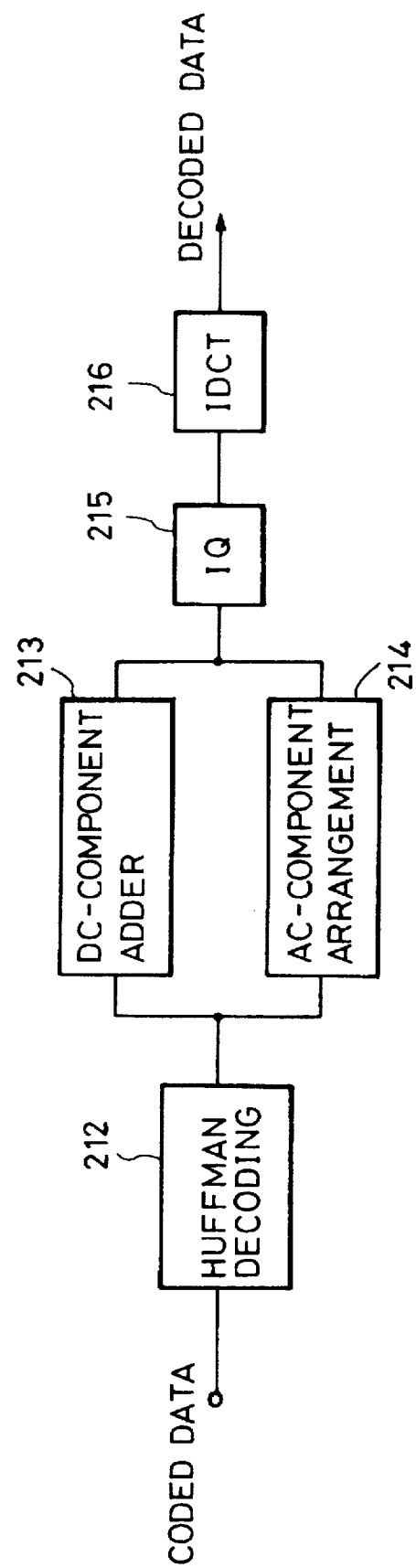
FIG. 4 shows a JPEG decoder.
Figure 5:
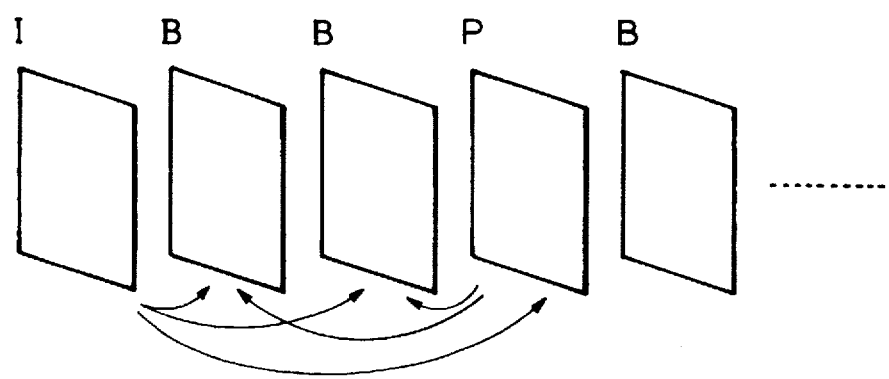
FIG. 5 illustrates a MPEG image configuration.

The coding and decoding algorithm in the base-line system, which is basic in the JPEG method, will be described below by referring to FIGS. 3 and 4.

Input image data is divided into blocks each having eight pixels by eight pixels in a blocking circuit 201. A discrete cosine transformation (DCT) circuit 202 applies two-dimensional DCT to the blocks to form horizontal and vertical spatial frequency components (DCT coefficients) comprising one DC component and 63 AC components.

Each obtained frequency component is divided by each specified coefficient (quantization coefficient) and is quantized by a quantizer 203. Then the DC component and the AC components are coded with different algorithm.

Generally, different quantization coefficients are used for different frequency components. Quantization coefficients for low frequencies, which are important for one's vision, are set to smaller than those for high frequencies. With these settings, high-frequency components, which is relatively not important, are cut, reducing the amount of the entire data.

Using the point that the DC component in a block is highly correlated with that in an adjacent block, the difference (differential) in the DC component between the current block and the preceding block is obtained in a differential circuit 204. A Huffman encoder 205 applies one-dimensional Huffman coding to the obtained differential to form coded DC-component data.

The 63 AC components are zig-zag scanned by a scan circuit 206 sequentially from low-frequency components, which is important visually, in order to convert the components into a one-dimensional array. Then, a determination circuit 207 determines whether each component has zero or a value (effective coefficient) other than zero.

A counter 208 counts zero run for a component having zero. A grouping circuit 209 classifies effective coefficients into groups. With the combination of the obtained run-length and group values, a Huffman encoder 210 performs two-dimensional Huffman coding to form coded AC-component data.

The Huffman coding assigns a shorter code to data which frequently appears (the differential for the DC component, and the combination of the run-length and the effective coefficients for the AC components), reducing the amount of the entire data.

All patterns can be expressed with a finite number of codes by assigning the specified code (ZRL code) to data which appears less frequently.

In the JPEG method, the above-described processing is applied to each block to perform coding of one color still picture.

Then, an attaching circuit 211 attaches marker codes and other codes to each coded data to produce JPEG-coded data, shown in FIG. 2.

Since the quantization coefficients and Huffman codes can be desirably specified, data expressing the quantization coefficients and Huffman codes used in coding is added after the SOI code.

The decoding algorithm will be described next.

The decoding algorithm is basically the inversion of the coding algorithm. Input coded data is decoded in a decoder 212 using-the Huffman table transmitted together with the data. The DC component is added to the DC component for the preceding block in an adder 213 to form the original DC component. The decoded AC frequency components are converted to the original two-dimensional array in an arrangement circuit 214.

The frequency components are inverse-quantized in an inverse-quantizer 215, then are applied inverse DCT in an inverse DCT circuit 216 to form the original image data (decoded data).

In the JPEG method, the above-described processing is applied to each block to perform decoding of one color still picture.

The above-described algorithm is a basic one in the JPEG method. The JPEG method includes an extended system which employs various types of hierarchy coding. When hierarchy coding is used, the SOF code indicates its type.

Among various types of data to be transmitted via the networks, MPEG data will be described below.

The MPEG method is one of international standards specified for the purpose of high-efficiency coding of moving pictures. Like the JPEG method, it basically uses the frequency characteristics of data and the visual characteristics of a person. It further uses redundancy in the time-axis direction unique to moving pictures to perform more highly efficient coding.

The MPEG method includes MPEG 1, which has a transmission rate of 1.5 Mbps at maximum for digital storage media, and MPEG 2, which has no upper limit in the transmission rate and is intended for use in all transmission systems, such as that using bidirectional digital multimedia, digital VTRs, advanced TV sets, and optical fiber networks. Since the basic algorithms are substantially the same, the data configuration and the coding and decoding algorithm of MPEG 1 will be described below.

In MPEG 2, usable coding systems are defined for a plurality of profiles, the Simple profile, the Main profile, the Scalable profile, the Spatially Scalable profile, and the High profile. The Main profile, which is the typical profile, is basically the same as MPEG 1.

The principle of the high-efficiency MPEG coding method will be described below.

In this high-efficiency coding method, redundancy in the time-axis direction is reduced by taking differential of data between frames. Then, the obtained differential data is applied DCT and variable-length coding to reduce redundancy in the spatial direction, implementing the high-efficiency coding as a whole.

In a moving picture, consecutive frames have high correlation. Using this feature, the differential between a frame to be coded and the time-forward or time-backward frame is taken to allow redundancy in the time-axis direction to be reduced.

MPEG uses an intra coded picture, which is obtained in the coding mode in which data is coded within a frame, a forward predictive coded picture (P-picture), which is obtained by coding the differential between the current frame and the time-forward frame, and a bidirectional predictive coded picture (B-picture). The B-picture is formed by coding whichever differential value is the smaller of that obtained between the current frame and the time-forward or time-backward frame and that obtained between the current frame and the frame interpolated from the time-forward and time-backward frames. These frames in their coding modes are combined in the specified sequence.

One I-picture, four P-pictures, and ten B-pictures are handled as a unit (one group of pictures (GOP)) in MPEG. It is recommended that one I-picture be placed at the beginning of a group and the combination of two B-pictures and one P-picture be placed next repeatedly. Putting I-pictures at a fixed interval enables partial reproduction with the GOP being used as a unit and special reproduction such as inverse reproduction, and prevents errors from spreading.

When a new object appears in a frame, the differential obtained between the current frame and the time-backward frame may become smaller than that obtained between the current frame and the time-forward frame.

MPEG performs the bidirectional predictive coding, described above, to compress data more efficiently.

In addition, MPEG does motion compensation.

Luminance data in four blocks, each of which comprises eight pixels by eight pixels, and chrominance data in two blocks are collected to form a macro block. The differential between the current macro block and a macro block close to the macro block corresponding to the current macro block in the time-forward frame or the time-backward frame is taken. A motion vector is detected by searching for whichever macro block has the smallest differential and the motion vector is coded as data.

In decoding, the corresponding macro-block data in the time-forward frame or the time-backward frame is extracted using this motion vector, and the coded data is decoded using motion compensation with the motion vector.

Motion compensation is performed with a macro block in the frame to be coded and a macro block in the time-forward frame which is decoded after it is once coded.

While MPEG 1 does motion compensation between frames, MPEG 2 performs motion compensation between fields.

The differential data and motion vectors obtained in the motion compensation, described above, are further coded with high efficiency using the DCT and Huffman coding, described before. The data configuration in the MPEG method will be described below.

Figure 6:
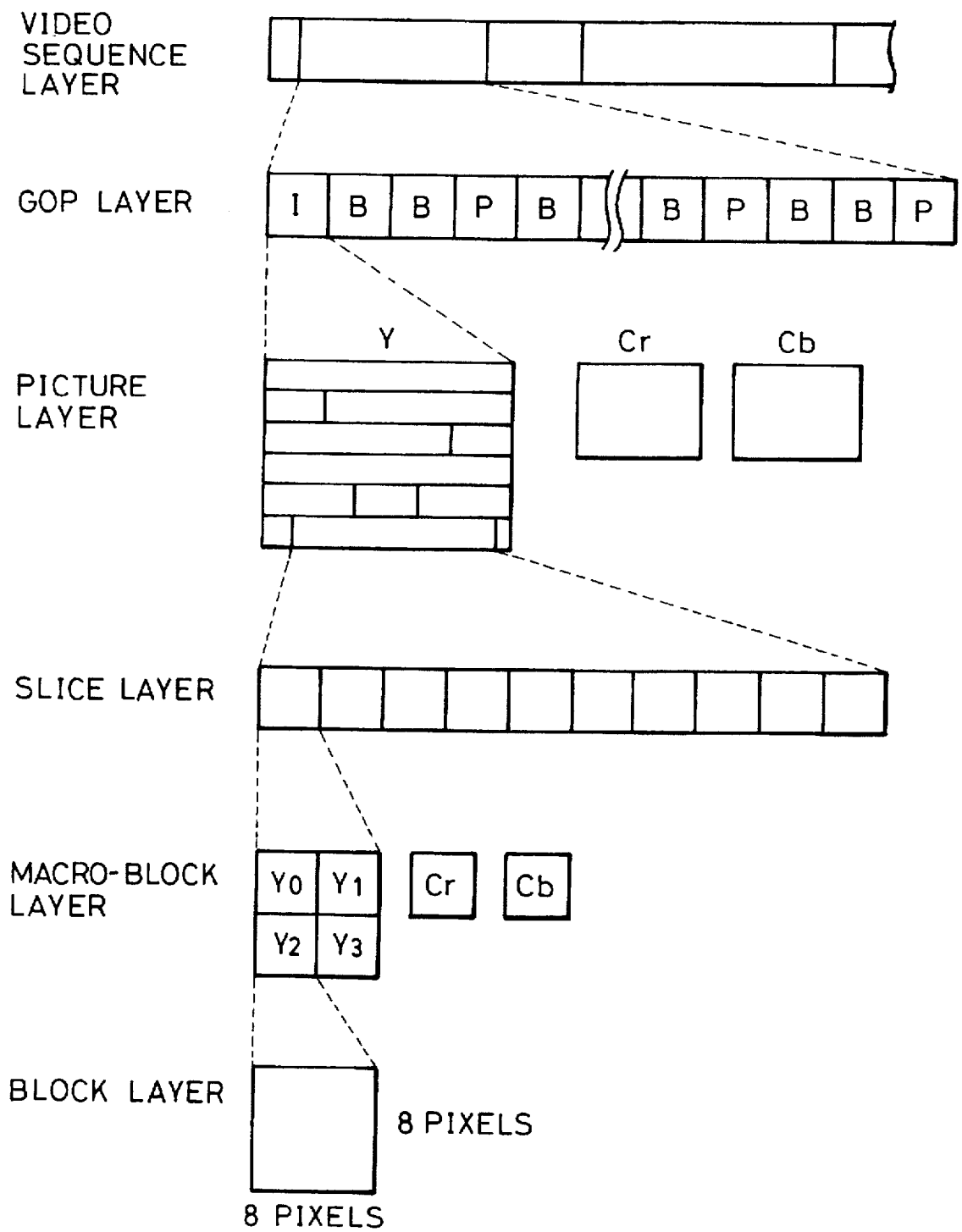
FIG. 6 illustrates the MPEG data configuration.

The data configuration has a hierarchy comprising a video sequence layer, a GOP layer, a picture layer, a slice layer, a macro-block layer, and a block layer, as shown in FIG. 6.

Each layer will be described below, beginning with the lowest layer.

The block layer comprises eight pixels by eight pixels for luminance data and chrominance data in the same way as for JPEG. Each block is applied DCT.

The macro block comprises luminance data in four blocks, each of which comprises eight pixels by eight pixels as described above, and each chrominance data in one block with a macro-block header attached. The MPEG method uses this macro block as a unit for motion compensation and coding.

The macro-block header includes motion compensation data and quantization data for each macro block, and data indicating whether six DCT blocks (Y0, Y1, Y2, Y3, Cr, and Cb) in each macro block contain data.

The slice layer comprises one or more consecutive macro blocks in the scanning order of an image, and a slice header. The same quantization step can be applied to a series of macro blocks in a slice layer.

The slice header has quantization-step data for each slice layer. When quantization-step data unique to each macro block is not provided, the data for the slice layer is set to a constant.

In the first macro block, the differential for the DC component is reset.

The picture layer has a plurality of slice layers in frame units. It comprises a header including a picture start code and one or more slice layers following the header. The header includes a code indicating the image coding mode and a code showing the precision of motion detection (pixel or half pixel).

The GOP layer comprises a header including a group start code and a time code indicating the elapsed time from the start of the sequence, and a plurality of I-frames, B-frames, and P-frames following the header.

The video sequence layer starts with a sequence start code and ends with a sequence end code. Between them, there is provided a plurality of GOPs which has the same control data required for decoding, such as the image size and aspect ratio.

In the MPEG method, which has the data configuration described above, a bit stream is specified in the standard.

A basic encoder and a basic decoder handling such MPEG data will be described below by referring to FIGS. 7 and 8.

Figure 7:
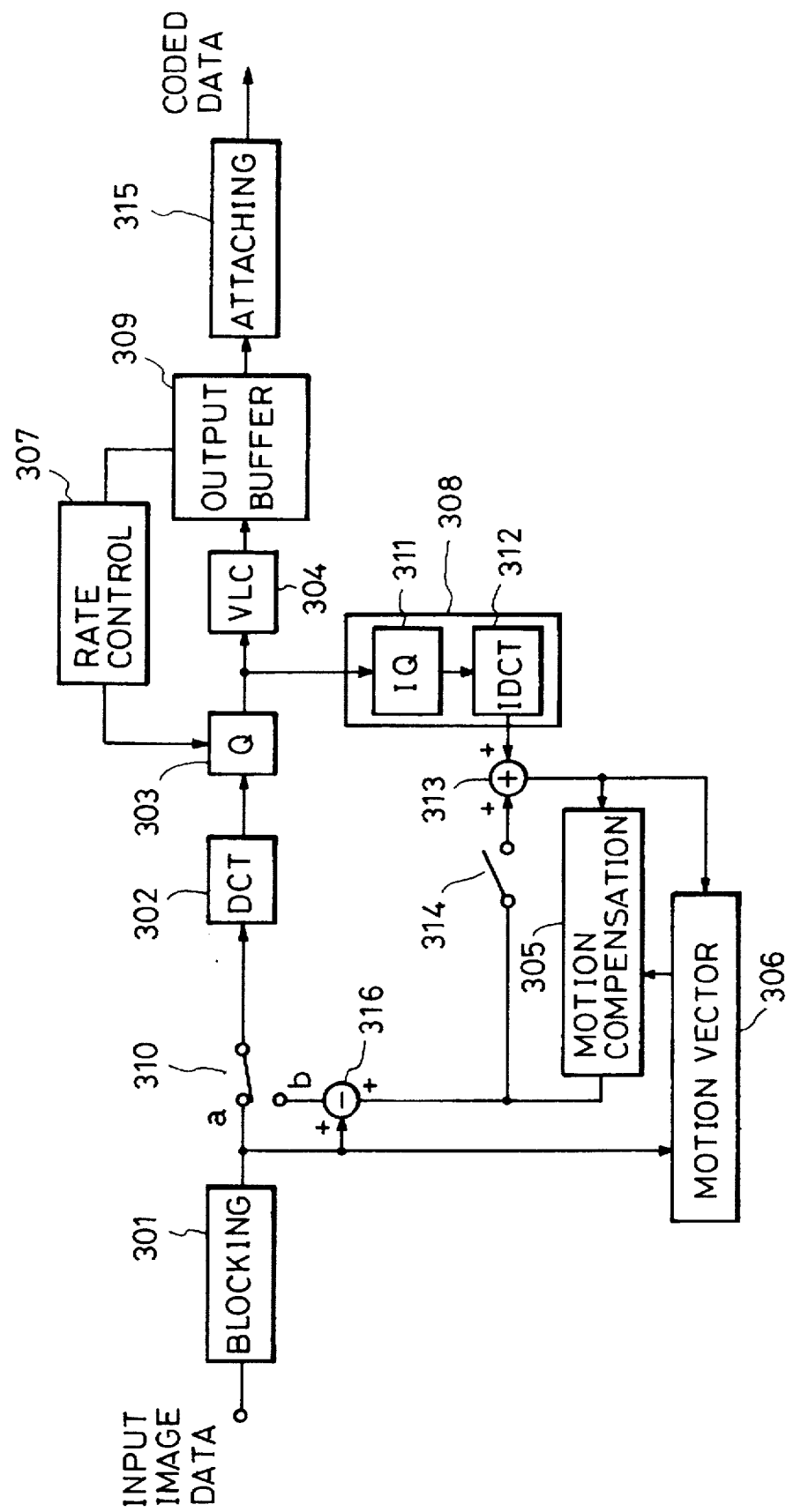
FIG. 7 shows a MPEG coder.
Figure 8:
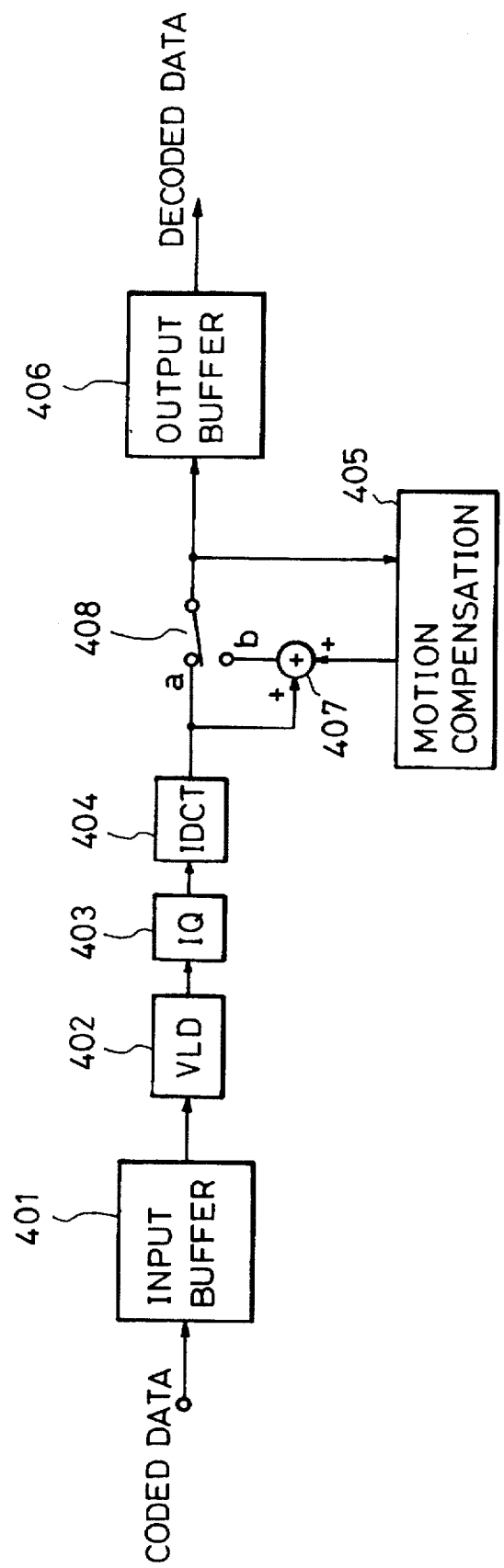
FIG. 8 shows a MPEG decoder.

A encoder generally comprises a blocking circuit 301, a DCT circuit 302, a quantizer 303, a variable-length coder (VLC) 304, a motion-compensation circuit 305, a motion-vector detector 306, a rate control circuit 307, a local decoder 308, and an output buffer 309, as shown in FIG. 7.

Figure 9:
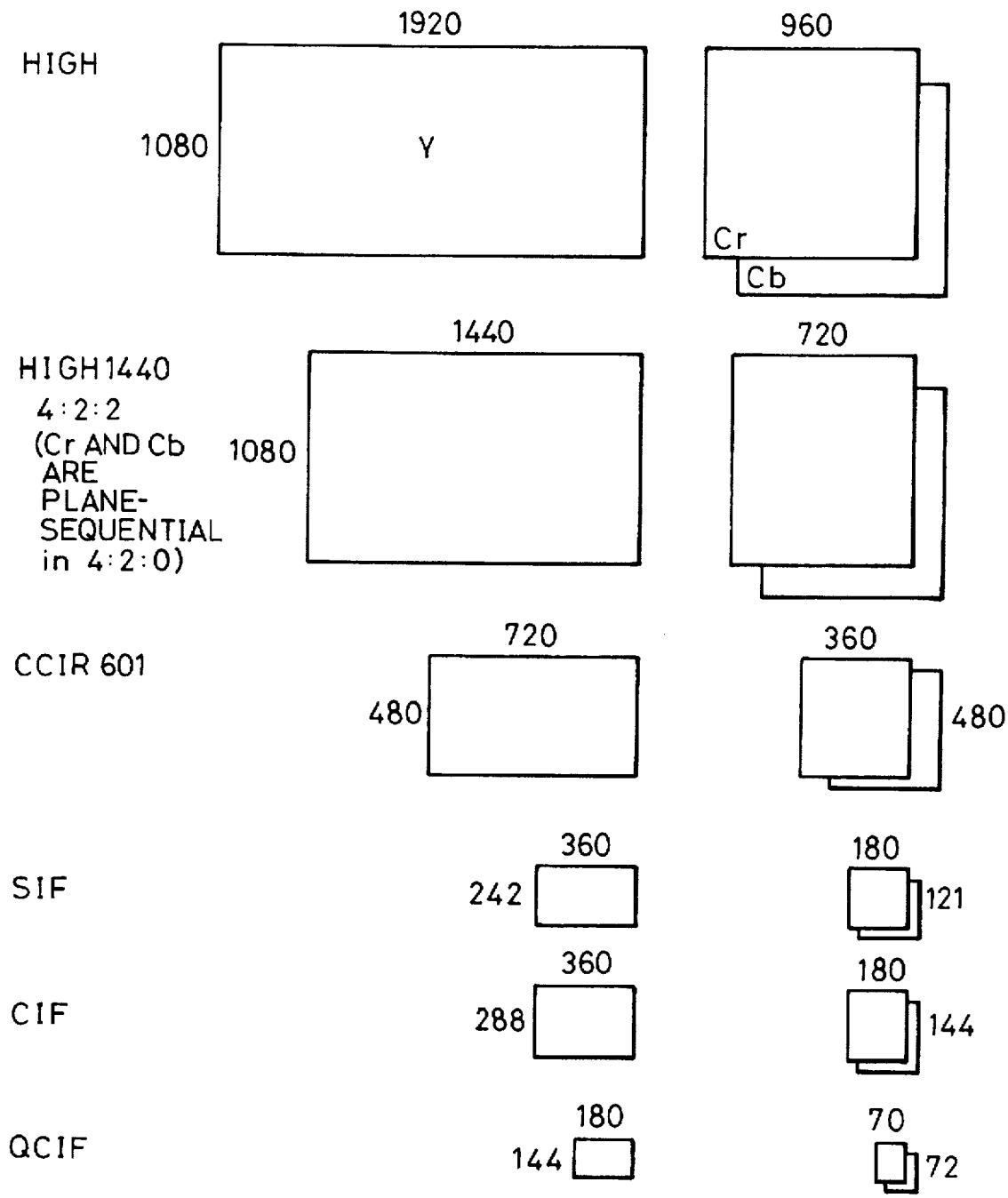
FIG. 9 illustrates the sizes of images to be coded.
Figure 10:
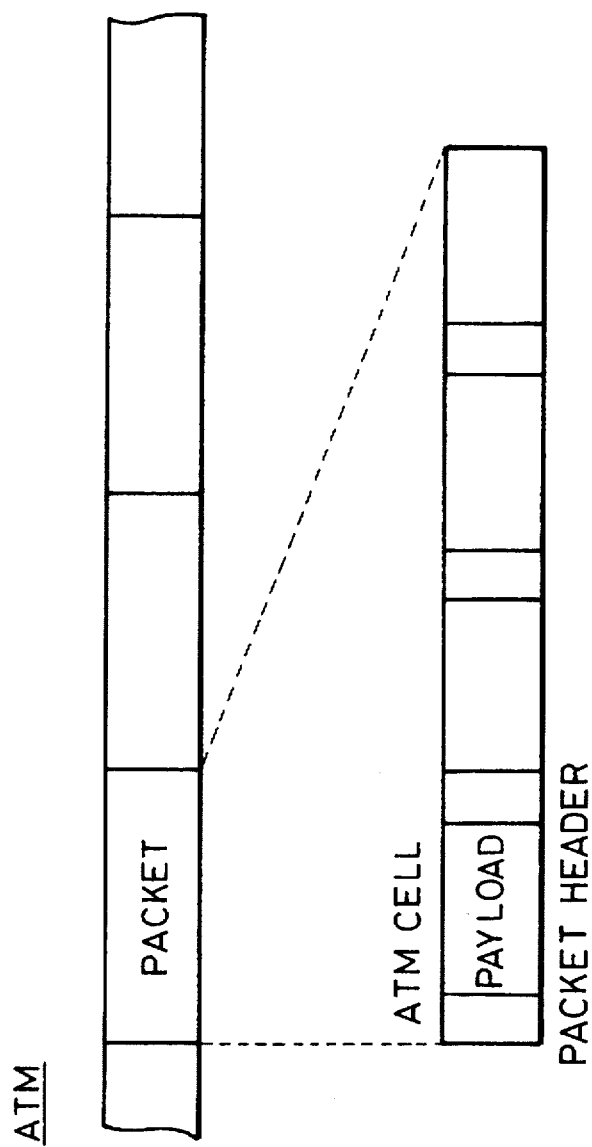
FIG. 10 illustrates a communication format.

Image sizes to be coded in this encoder correspond to, as shown in FIG. 9, the High format having 1920 by 1080 pixels (corresponding to the High level in MPEG 2), the High 1440 format having 1440 by 1080 pixels (corresponding to the High 1440 level in MPEG 2), the CCIR. 601 format of 4:2:2 or 4:2:0 (corresponding to the Main level in MPEG 2), the SIF format, the CIF format, and the QCIF format. In MPEG 1 and the low level of MPEG 2, an image corresponding to the SIF format is to be coded.

In this encoder, image data to be coded is divided into blocks having eight by eight pixels in the blocking circuit 301, and sent to the DCT circuit 302 through a switch 310. The switch 310 is switched depending on whether input image data is an intra-frame (I-frame) or a frame other than that (P-frame or B-frame). When an intra-frame is input, the switch is connected to contact a. It is connected to b in the other cases.

Intra-frame data is applied DCT by the DCT circuit 302. The obtained DCT coefficients are quantized in the quantizer 303, coded in the variable-length coder 304, and then stored in the buffer 309 tentatively.

For input data other than intra-frame data, the switch 310 is connected to contact b and motion compensation, described before, is performed. Data quantized in the quantizer 303 is decoded in the local decoder 308 comprising an inverse quantizer 311 and an inverse DCT circuit 312.

There is also shown in the figure an adder 313, a switch 314 which closes only for data other than intra-frame data, and a subtracter 316. The locally decoded image data is converted to the corresponding macro blocks in the specified frame (forward frame, backward frame, or the frame interpolated from these frames) by referring to the motion vector detected in the motion vector detector 306.

The output from the motion-compensation circuit 305 is subtracted from input image data in the subtracter 316 to obtain the differential. The differential is coded in the DCT circuit 302, the quantizer 303, and the variable-length coder (Huffman coder) 304, and stored in the buffer 309.

The Huffman encoder is basically the same as the encoder in JPEG except that the specified code (escape code) is exclusively assigned to data which appears less frequently.

The motion-vector detector 306 compares the frame data to be coded and the specified reference frame data to obtain a motion vector. The output from the detector 306 is supplied to the motion-compensation circuit 305 to specify the macro block to be output from the motion-compensation circuit 305.

The rate control circuit 307 switches the quantization step in the quantizer 303 according to the occupation rate of coded data in the buffer to perform coding-amount control.

At the last stage, an attaching circuit 315 attaches various headers to coded data and sends it as MPEG data conforming to the MPEG method.

The decoder basically performs the inverse operation of the encoder. It comprises an input buffer 401, a variable-length decoder (VLD) 402, an inverse quantizer (IQ) 403, an inverse DCT circuit (IDCT) 404, a motion-compensation circuit 405, and an output buffer 406, as shown in FIG. 8.

Coded data sequentially read from the input buffer 401 is handled in the variable-length decoder 402, the inverse quantizer 403, and the inverse DCT circuit 404, and converted to data in an spatial region.

An adder 407 adds the differential output from the motion-compensation circuit 405 to the output of the inverse DCT circuit 404. A switch 408 selects between the output of the inverse DCT circuit 404 and the output of the adder 407. The switch 408 is connected to contact a according to the coding identification code detected by a data detector (not shown) when an intra-frame is input. The switch is connected to contact b when a frame other than an intra-frame is input.

The decoded data is tentatively stored in the output buffer 406, returned to the original spatial arrangement, then output as one-frame image data.

An ATM communication format will be described below.

In ATM communication, a series of bit stream is divided into a plurality of fixed-length packets each of which comprises a plurality of (for example, four) ATM cells.

Each ATM cell comprises a packet header and payloads for data. Generally the header has five bytes and the data has 48 bytes.

Since ATM communication can perform data transmission independently of the bit rate of a network (asynchronously) and can specify the desired transmission rate with the number of cells-to be transmitted per time unit, it is suitable for a transmission system for transmitting various types of data in combination.

The personal computer 115, shown in FIG. 1, which serves as an image reproduction apparatus according to the present embodiment will be described below.

Figure 11:
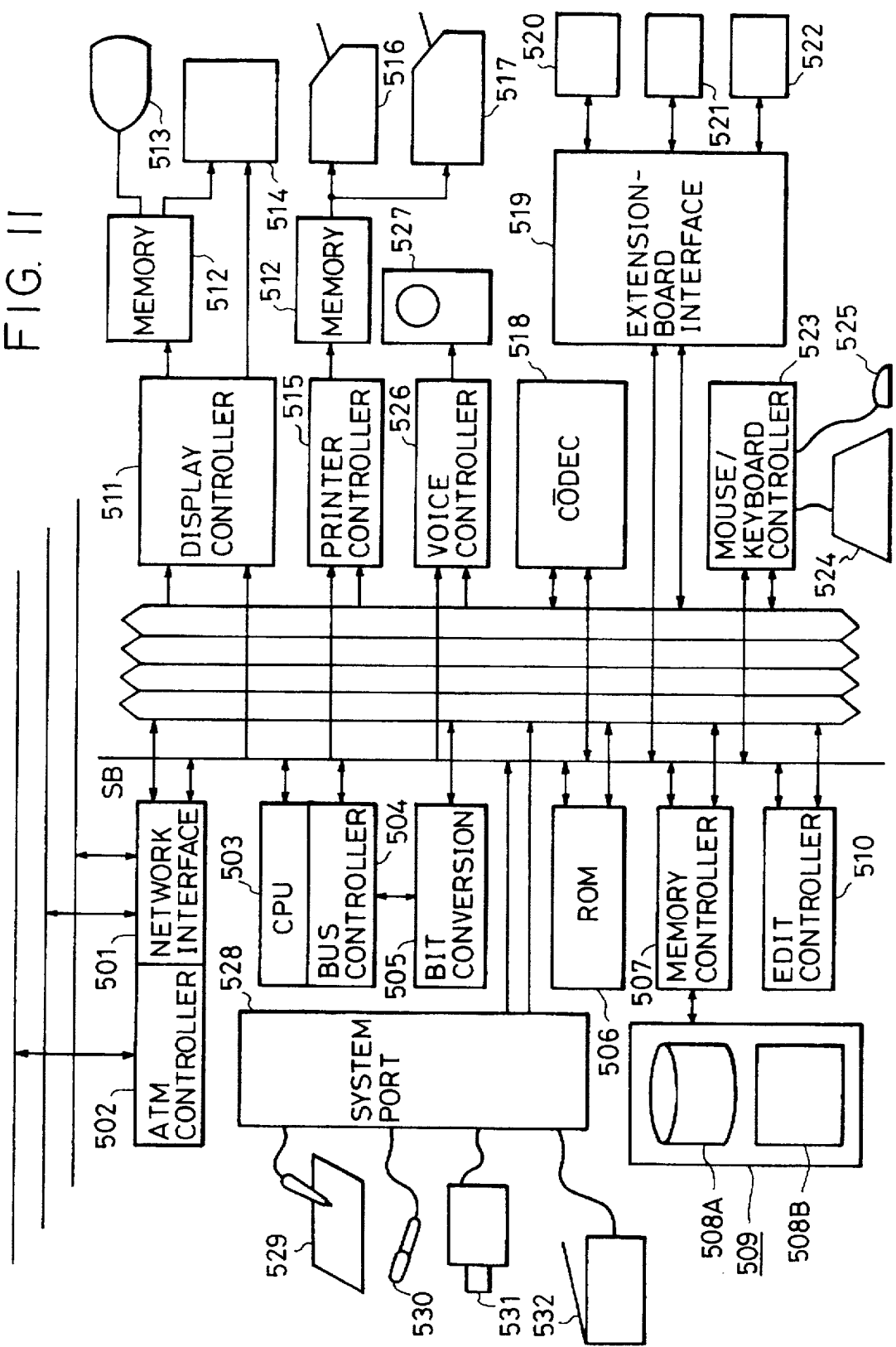
FIG. 11 shows the configuration of a personal computer.

FIG. 11 shows the configuration of the personal computer according to the present embodiment. In this embodiment, the personal computer receives image data compressed according to the MPEG, described before, at a plurality of channels (two channels) at the same time and outputs the integrated image to output devices, such as a monitor and a printer.

A first image data in the first channel is transmitted with other data including voice data through the ATM network 1 in which image data coded in MPEG is transmitted with fixed-length packets comprising a plurality of ATM cells described above. The first image data is received at a network interface 501 comprising a system decoder and buffer circuit.

A second image data in the second channel is reproduced at the specified timing described later from a data storage unit 509 using a CD-ROM unit described later, and output to the network interface 501 together with other data including voice data.

In addition to handling data corresponding to various systems as described above, the personal computer is provided with a multi-bus system in which the most suitable bus is selectively used according to the amount of data to be transmitted and the transmission rate required for handling the data, in order to provide various functions. In this embodiment, the multi-bus system has a 16-bit data bus D1, a 32-bit data bus D2, a 64-bit data bus D3, an extended 128-bit data bus D4, and a system bus SB.

To enable its functions to be extended, the personal computer has an extension board interface described later. Connecting extension boards to the interface extends the functions of the personal computer.

The personal computer will be described below in detail.

In FIG. 11, through a network interface 501 and an ATM controller 502 integrated with the interface, various data items are transferred at the transmission channels described above. The ATM controller 502 performs various communication control such as congestion control in the ATM LAN as well as the ATM-switch function.

A CPU 503 controlling the entire computer is provided with a bit converter 505 and a bus controller 504 serving as a sub CPU composing the multi-bus system. The multi-bus system enables the required handling rate by appropriately selecting any of the buses according to the amount of data to be handled and the handling rate.

There is also shown ROM 506 and a memory controller 507. The memory controller 507 transfers data to and from the external storage unit 509 comprising a hard disk unit 508A and a CD-ROM unit 508B.

An edit controller 510 controls the phase between data in plural channels in image editing, and adjusts luminance and color components.

A display controller 511 outputs image data, which is displayed on a CRT display 513 or an ferroelectric liquid crystal (FLC) display 514 through memory 512. The display controller 511 also performs appropriate processing according to the type of a display device to be used.

According to image data to be printed, a printer controller 515 selectively uses a thermal printer 516 or a hybrid printer 517 having a printer section using the bubble-jet method or other methods different from that for the thermal printer. The memory 512 may be shared for the displays and the printers.

A codec 518 for coding and decoding data conforms to the JPEG and MPEG methods, described before.

The extension board interface 519 enables the personal computer to expand its functions by connecting various extension boards 520, 521, and 522 through the extension board interface.

A mouse/keyboard controller 523 allows a keyboard 524 and a mouse 525 to be connected through it.

These is also shown a voice processing section 526 and a speaker 527.

The personal computer is also connected to a hand-write input unit 529, a microphone 530, a video camera 531, and a scanner 532 through the system port 528.

Since the personal computer having the above-described configuration is provided with the multi-bus system comprising the multiple data buses D1, D2, D3, and D4, the bus controller 504, and the bit converter 505, it selectively uses the most appropriate data bus according to the amount of data and the transmission and handling rates required for processing.

With the function-extension capability enabled by the extension board interface 519 and extension boards to be connected, a board performing coding and decoding corresponding to the above-described profiles is connected, for example, as a codec extension board to allow such processing.

The codec 518 in the personal computer, shown in FIG. 11, will be described below.

Figure 12:
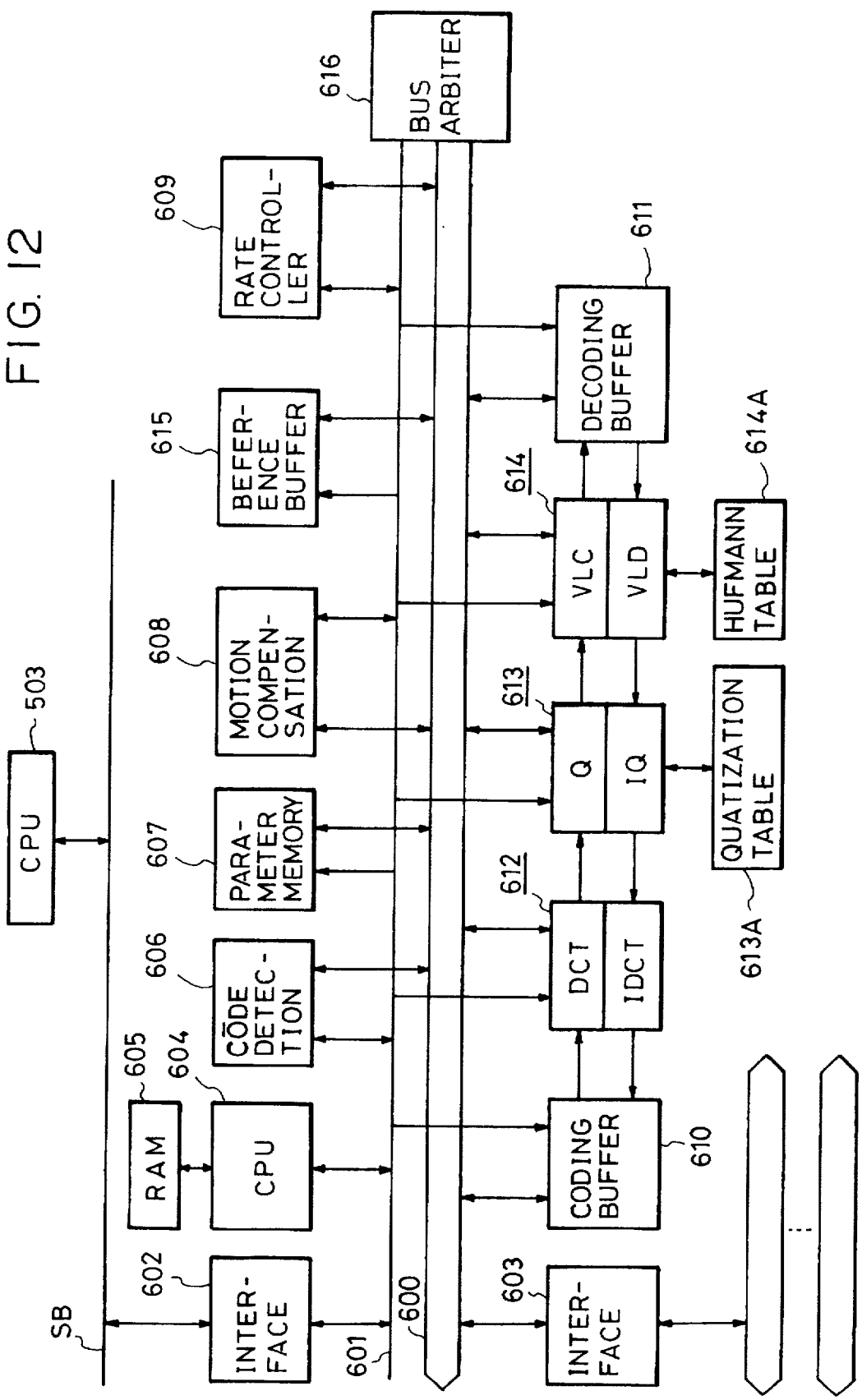
FIG. 12 shows the configuration of a codec used in the personal computer shown in FIG. 11.

As shown in FIG. 12, the codec comprises various function blocks connected to a data bus 600 and the system bus 601. The codec transfers data and commands to and from the CPU 503 and the edit controller 510 through the system bus SB and the data buses of the personal computer, a microcomputer interface 602, and a data interface 603.

In the figure, a CPU 604 controls entire codec operations. The CPU 604 controls coding and decoding according to various programs, such as an edit program, stored in RAM 605 in advance.

A code detector 606 detects coded data and control codes therein, such as start codes (time codes), the picture type (I, P, or B) and various headers.

Each code detected by the code detector 606 is transmitted to the CPU 604 through a data bus or the system bus for operation control, and is stored in parameter memory 607 and then transmitted to appropriate blocks.

There is also shown a motion-compensation unit 608, a rate control unit 609, a coding buffer unit 610, and a decoding buffer unit 611.

Input image data transmitted through the coding buffer unit 610 or differentials (data to be coded) and motion-vector data transmitted from the motion-compensation unit 608 are handled sequentially by a conversion unit 612 comprising a plurality of DCT circuits and inverse DCT (IDCT) circuits, a quantization unit 613 comprising a plurality of quantization circuits (Q) and inverse quantization circuits (IQ), and a variable-length coding unit 614 comprising a plurality of variable-length coding circuits (VLC) and variable-length decoding circuits (VLD). They are then stored in the decoding buffer 611 serving as an output buffer in coding, and output via the data bus and the interface 603 at the timing specified by the CPU 604.

The quantization unit 613 and the variable-length coding unit 614 are provided with quantization table memory 613A and Huffman table memory 614A, respectively, which receive various parameters required for processing in the units, such as quantization steps and Huffman codes, from the parameter memory 607, as required.

Coded data (data to be decoded) transmitted through the decoding buffer 611 is handled sequentially by the conversion unit 612, the quantization unit 613, and the variable-length coding unit 614, then is stored in the coding buffer 610 serving as an output buffer in decoding, and is output via the data bus and the interface 603 at the timing specified by the CPU 604. The coding buffer 610 is also used as synthesis memory in editing plural images.

The motion-compensation unit 608 uses a reference buffer 615 to perform motion compensation in P and B frames during coding and decoding. In this embodiment, the motion-compensation unit 608 is also used for operation for obtaining DC-component differentials in the JPEG coding.

A bus arbiter 616 arbitrates the data buses in pipeline processing or other processing.

The codec, configured as described above, performs coding or decoding such that the CPU 604 operates the specified units by receiving directions from the CPU 603, which is the CPU of the personal computer itself.

The codec controls data transmission to and operation of each unit in the most suitable sequence according to various types of processing, such as simultaneous coding or decoding of plural types of data items, coding and decoding at the same time, and simultaneous processing of coding/decoding and various types of handling including communications, displaying, and printing out in the personal computer. The operation program corresponding to this sequence is stored in RAM 605 in advance. The program can be updated as required.

Editing operation in such a codec system will be described below.

Reading operation in the image storage means 509 is controlled by the edit controller 510. The coding buffer unit 610 and the decoding buffer unit 611 in the codec are controlled by the CPU 604. The coding buffer unit 610 and the decoding buffer unit 611 control the timing of other circuits according to operation on the keyboard 524 and the phase information of the first image data supplied from the code detector 606.

In other words, the CPU 604 receives the start code of an I frame of the first image data decoded by the code detector 606 and that of an I frame of the second image data, and controls the output timing in the buffer units according to the phase (time) difference between the start codes.

When the start codes of the image data shift from each other, that is, as shown in FIG. 13, when an I frame of the first image data corresponds to a P or B frame of the second data, decoding is performed at this shift condition in the decoders and the timing of the forward image data (the first image data in this case) is controlled such that the image phases match at the output timing in the buffer unit 610.

When the start codes of the image data match as shown in FIG. 14, the image data phases are shifted by controlling the output timing of the buffer in the network interface 501. Then, decoding of the image data is performed at this shift condition and timing is controlled again such that the image data phases match by delaying the forward image data at the output timing.

In this embodiment, the CPU 604 adjusts the phases when the phases can be adjusted in the codec. If they cannot be adjusted in the codec, the edit controller 510 controls reading operation from the storage means 509.

As described above, in this embodiment, the image data phases for the channels are shifted in decoding such that I frames of the image data do not match in timing, restricting power consumption.

When the images are displayed on a monitor, I frames of the image data are controlled to match in timing, making the quality of each image data synthesized equal and obtaining the high-quality synthesized image.

Image data compressed in MPEG is described in this embodiment. The present invention does not restrict the compression method to MPEG. The present invention can also be applied to various types of coded data, such as MPEG data and JPEG data, and image synthesis between JPEG data.

[Advantages]

As clearly understood from the above description, according to the present invention, various problems caused by the phase shift between image data on plural channels are solved, changes in power consumption in decoding is restricted, and the quality of a synthesized image is improved.

What is claimed is:

1. An image processing device comprising:

input means for inputting a plurality of units of encoded image data in parallel, the encoded image data in first and second ones of the units having been encoded by a periodic encoding method which periodically changes an encoding process, and each of the first and second units including intra-coded image data and inter-coded image data;

detection means for detecting a phase difference, corresponding to the periodic encoding method, between the first and second units;

decoding means for decoding the plurality of units; and control means for controlling a relative timing between the first and second units on the basis of the phase difference detected by said detection means so that the intra-coded image data of one of the first units and the inter-coded image data of one of the second units are concurrently supplied to said decoding means.

2. An image processing device according to claim 1, wherein said control means controls the relative timing so that a phase related to the periodic encoding method between the first and second units is shifted.

3. An image processing device according to claim 2, wherein the encoded image data of each of the first and second units has been encoded by the MPEG method.

4. An image processing device according to claim 2, further comprising output means for supplying respective units of decoded image data corresponding to the first and second units decoded by said decoding means, and wherein phases relating to the periodic encoding method between the units of the decoded image data coincide.

5. An image processing device according to claim 4, further comprising display means for displaying an image corresponding to the decoded image data output from said output means.

6. An image processing method comprising the steps of:

inputting a plurality of units of encoded image data in parallel, the encoded image data in first and second ones of the units having been encoded by a periodic encoding method which periodically changes an encoding process, and each of the first and second units including intra-coded image data and inter-coded image data;

detecting a phase difference, corresponding to the periodic encoding method, between the first and second units;

decoding the plurality of units; and controlling a relative timing between the first and second units on the basis of the phase difference detected at said detection step so that the intra-coded image data of one of the first units and the inter-coded image data of one of the second units coincide.

7. An image processing method according to claim 6, wherein the relative timing is controlled in said control step so that a phase relating to the periodic encoding method between the first and second units is shifted.

8. An image processing method according to claim 7, wherein the encoded image data of each of the first and second units has been encoded by the MPEG method.

9. An image processing method according to claim 7, further comprising an output step for supplying respective units of decoded image data corresponding to the first and second units decoded in said decoding step, and wherein phases relating to the periodic encoding method between the units of decoded image data coincide.

10. An image processing method according to claim 9, further comprising a display step for displaying an image corresponding to the decoded image data output in said output step.

* * * * *